(12) United States Patent
Keam et al.

(10) Patent No.: US 10,444,866 B2
(45) Date of Patent: Oct. 15, 2019

(54) FORCE SENSOR FOR A STYLUS

(71) Applicant: Microsoft Technology Licensing, LLC, Redmond, WA (US)

(72) Inventors: Nigel Stuart Keam, Bellevue, WA (US); John Michael Lutian, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 136 days.

(21) Appl. No.: 15/351,130

(22) Filed: Nov. 14, 2016

(65) Prior Publication Data

US 2018/0136747 A1 May 17, 2018

(51) Int. Cl.
*G06F 3/0354* (2013.01)
*G06F 3/038* (2013.01)

(52) U.S. Cl.
CPC ........ *G06F 3/03545* (2013.01); *G06F 3/0383* (2013.01); *G06F 3/03542* (2013.01)

(58) Field of Classification Search
CPC .. G06F 3/03545; G06F 3/041; G06F 3/03542; G06F 3/0383; G06F 2203/04105
See application file for complete search history.

(56) References Cited

U.S. PATENT DOCUMENTS

| | | | |
|---|---|---|---|
| 4,786,764 A | 11/1988 | Padula et al. | |
| 5,357,062 A | 10/1994 | Rockwell et al. | |
| 6,567,173 B1 * | 5/2003 | Johannesen | A61B 5/02154 356/480 |
| 6,592,039 B1 | 7/2003 | Smith et al. | |
| 6,894,683 B2 * | 5/2005 | Clapper | G06F 3/03545 178/19.01 |
| 7,098,894 B2 * | 8/2006 | Yang | G06F 3/03545 178/19.05 |
| 7,454,977 B2 | 11/2008 | Larsen et al. | |
| 7,770,465 B2 | 8/2010 | Lapstun et al. | |

(Continued)

FOREIGN PATENT DOCUMENTS

| | | |
|---|---|---|
| WO | 2015014389 A | 2/2015 |
| WO | 2016018403 A1 | 2/2016 |

OTHER PUBLICATIONS

"HP Executive Tablet Pen", In Whitepaper of HP, Apr. 27, 2013, 1 page.

*Primary Examiner* — Grant Sitta
(74) *Attorney, Agent, or Firm* — Alleman Hall Creasman & Tuttle LLP

(57) ABSTRACT

Examples are provided for measuring force applied to a device, such as a stylus tip. An example stylus includes a stylus body, a stylus tip, and the stylus tip including a light emitting device and a compressible light reflecting optic, the light emitting device comprising a light emitter and a light detector, and the compressible light reflecting optic comprising a first reflective layer configured to (i) allow a first portion of light from the light emitting device to pass and (ii) to reflect a second portion of light from the light emitting device, and a second reflective layer, more reflective than the first reflective layer, configured to reflect light from the light emitting device, the first layer being spaced from the second layer by a light-transmissive material. A force exerted on the stylus tip is measurable based at least on a parameter of light received at the light detector.

17 Claims, 4 Drawing Sheets

(56) References Cited

U.S. PATENT DOCUMENTS

| | | | | |
|---|---|---|---|---|
| 8,736,581 B2* | 5/2014 | Han | G06F 3/0412 | 178/18.09 |
| 8,988,398 B2* | 3/2015 | Cao | G06F 3/0383 | 345/158 |
| 9,128,541 B2* | 9/2015 | Fergusson | G06F 3/03545 | |
| 9,740,312 B2* | 8/2017 | Barel | G06F 3/03545 | |
| 9,841,828 B2* | 12/2017 | Peretz | G06F 3/03545 | |
| 9,874,949 B2* | 1/2018 | Stern | G06F 3/0383 | |
| 10,048,778 B2* | 8/2018 | Mishalov | G06F 3/033 | |
| 2003/0146906 A1* | 8/2003 | Lin | G06F 3/03545 | 345/179 |
| 2003/0197690 A1* | 10/2003 | Zinnenkov | G06F 3/03542 | 345/179 |
| 2005/0110781 A1* | 5/2005 | Geaghan | G06F 3/03545 | 345/180 |
| 2006/0007186 A1 | 1/2006 | Homer et al. | | |
| 2006/0028456 A1* | 2/2006 | Kang | G06F 3/0312 | 345/179 |
| 2006/0034566 A1* | 2/2006 | Wakita | G02B 6/0038 | 385/31 |
| 2006/0202975 A1* | 9/2006 | Chiang | G06F 3/03545 | 345/179 |
| 2008/0007542 A1* | 1/2008 | Eliasson | G06F 3/0346 | 345/176 |
| 2008/0018612 A1* | 1/2008 | Nakamura | G06F 3/0354 | 345/173 |
| 2008/0030472 A1* | 2/2008 | Collins | G06F 3/0317 | 345/166 |
| 2008/0284925 A1* | 11/2008 | Han | G06F 3/0425 | 349/12 |
| 2009/0237374 A1* | 9/2009 | Li | G06F 3/0414 | 345/174 |
| 2010/0051356 A1* | 3/2010 | Stern | G06F 3/03545 | 178/19.04 |
| 2010/0168620 A1* | 7/2010 | Klimovitch | A61B 5/042 | 600/587 |
| 2010/0253650 A1* | 10/2010 | Dietzel | G01L 1/241 | 345/175 |
| 2011/0169775 A1* | 7/2011 | Liaw | G06F 3/03545 | 345/175 |
| 2011/0234549 A1* | 9/2011 | Matsumoto | G06F 3/03545 | 345/179 |
| 2012/0253165 A1* | 10/2012 | Yen | A61B 3/16 | 600/398 |
| 2012/0318074 A1* | 12/2012 | Kyung | G01L 1/243 | 73/862.624 |
| 2013/0100070 A1* | 4/2013 | Zheng | G06F 3/042 | 345/174 |
| 2013/0207937 A1 | 8/2013 | Lutian et al. | | |
| 2013/0257812 A1* | 10/2013 | Wang | G06F 3/043 | 345/175 |
| 2013/0257824 A1* | 10/2013 | Wang | G06F 3/03545 | 345/179 |
| 2014/0019070 A1 | 1/2014 | Dietz et al. | | |
| 2014/0111480 A1* | 4/2014 | Kim | G06F 3/016 | 345/175 |
| 2014/0232693 A1* | 8/2014 | Schuckle | G06F 3/0386 | 345/175 |
| 2015/0029155 A1* | 1/2015 | Lee | G06F 3/042 | 345/175 |
| 2015/0177909 A1* | 6/2015 | Hoffman | G06F 3/042 | 345/175 |
| 2015/0242057 A1* | 8/2015 | Galela | G06F 3/0428 | 345/175 |
| 2015/0286293 A1* | 10/2015 | Gruhlke | G06F 3/03542 | 345/182 |
| 2016/0103026 A1* | 4/2016 | Povazay | G01L 5/0047 | 73/800 |
| 2016/0154531 A1* | 6/2016 | Wall | G06F 1/3262 | 345/175 |
| 2017/0075441 A1* | 3/2017 | Leigh | G06F 3/03545 | |
| 2017/0261388 A1* | 9/2017 | Ma | G01L 1/2287 | |
| 2017/0332911 A1* | 11/2017 | Won | G01L 1/247 | |

* cited by examiner

FORCE SENSOR FOR A STYLUS

BACKGROUND

Touch-sensitive computing devices respond to inputs applied to a touch surface of the device, such as from a finger, stylus, or other implement. The inputs detected by the touch-sensitive computing devices are used to effect various control over the devices.

DETAILED DESCRIPTION

The use of an input device, such as a stylus, to provide input to a touch-sensitive display device may provide an experience that simulates writing and/or drawing with conventional implements, such as pen/pencil and paper. However, some stylus devices (e.g., with passive stylus configurations) are unable to mimic the differential output of pens and pencils responsive to different amounts of force. For example, the thickness and/or heaviness of a pen/pencil output may be controlled by adjusting an amount of force, used to press the pen/pencil against paper. In order to provide similar functionality in a stylus/display environment, some stylus devices (e.g., with active stylus configurations) include a force measurement device that uses a spring or other mechanical device to measure force applied to the tip of the stylus. However, such force measurement devices create an obvious axial displacement of the stylus or stylus tip, resulting in an unnatural experience that does not mimic the use of a pen Or pencil on paper.

In order to provide a stylus input experience that reduces the above-described unnatural tactile experience, the disclosure provides for a stylus or other device including a force sensing mechanism that measures force on a component (e.g., a stylus tip) without any (or with minimal) discernable displacement of the component. The described force sensing mechanism includes a light emitting device (e.g., a laser or other light emitter and pickup device) that directs light toward a compressible light reflecting optic. The compressible light reflecting optic includes a sandwiched configuration of two reflective layers (a layer closest to the light emitter being less reflective than the layer furthest from the light emitter) spaced from one another by a compressible light transmissive layer. A parameter of light reflected from the first and second reflective layers may be affected by an amount of compression of the light transmissive layer (due to force applied to a stylus tip). This parameter may be used to determine an amount of force applied to the stylus tip, as will be described in greater detail below.

Figure 1:
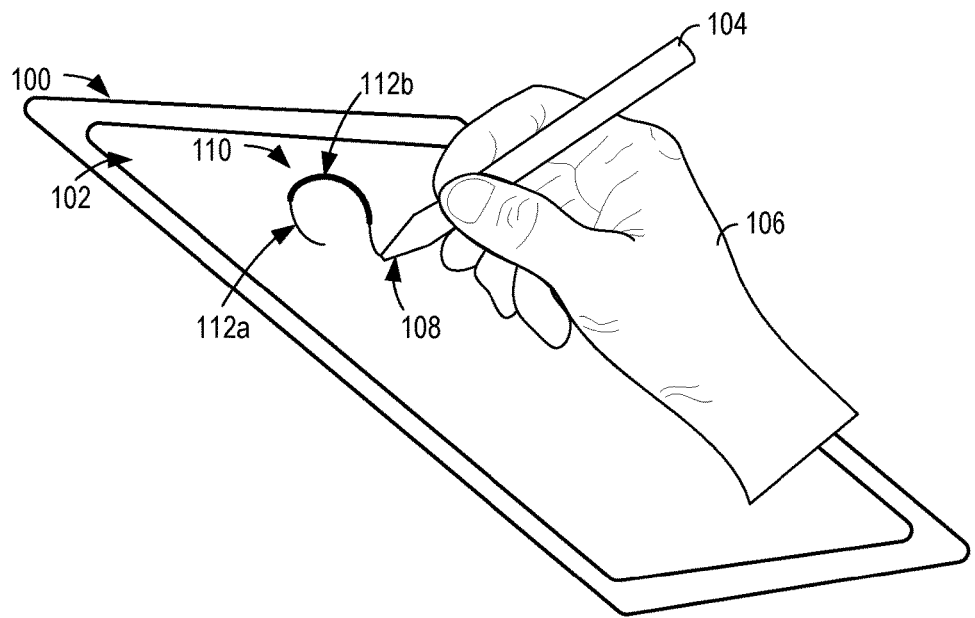
FIG. 1 shows an example computing device configured to receive input from a stylus.

FIG. 1 shows an example computing device 100 that may use a touch sensor and force measurement capabilities to enable user interaction with the device. For example, the computing device 100 may include a display 102 for displaying a user interface and/or other user-interactive content. The display 102 may include a touch sensor, such that the display is a touch-sensitive display configured to detect the presence of touch and/or hover input to the display. The touch sensor of the display 102 may use any suitable touch or hover sensing mechanism to detect a presence, position, and/or other features of input provided to the display. The touch sensor may be configured to detect input provided by any suitable input mechanism, including a hand, finger, stylus, and/or other input device. As used herein, the terms touch input and user input may include input provided by any of the above input devices. In the illustrated example, user input to the display 102 is provided via a stylus 104 operated by a user 106.

While the touch sensor of display 102 may be configured to determine some features of user input, the stylus 104 may be configured to provide additional sensing capabilities. For example, the stylus 104 may include a force detection sensor configured to detect a force applied to a tip 108 of the stylus (e.g., when the stylus contacts the display 102). By reporting this force measurement to the computing device 100, the computing device may be controlled differently based on the amount of force applied to the stylus tip. In the illustrated example, this differential control enables freehand pen-type markings to have varying widths based on the amount of force applied to the tip of the stylus 104.

For example, while drawing a shape 110, the user may have applied less force to the stylus tip (e.g., pressed the stylus against the display with a lower amount of force) at the beginning of the input than in the middle of the input. The resulting shape 110 is therefore displayed as having a thinner line at the starting portion 112a of the shape (when a lower amount of force was applied to the stylus tip) than in the middle portion 112b of the shape (when a higher amount of force was applied to the stylus tip). This is but one example of differential control that may be performed based on force on the stylus tip. Other nonlimiting examples include charging a color of markings drawn using the stylus, changing an input mode (e.g., from a primary input mode, such as drawing, to a secondary input mode, such as selecting), changing a selection action (e.g., selecting one object responsive to force under a threshold and selecting all displayed objects or all objects in a list responsive to force above the threshold), and/or otherwise altering the response to user input based on an amount, of force applied to the stylus tip.

Some force sensors include mechanical components, such as springs, that depress by a large amount during normal use of the stylus. In such force sensors, the amount of depression of the mechanical component may be perceptible by a user due to the axial displacement of the component to which force is applied (e.g., a stylus tip). This depression may provide an artificial experience that is unlike pressing on conventional writing implements, such as pens and pencils. The force sensing mechanisms described herein use a force sensing mechanism that measures force without displacing a mechanical component to a degree that is discernable by a user.

Figure 2:
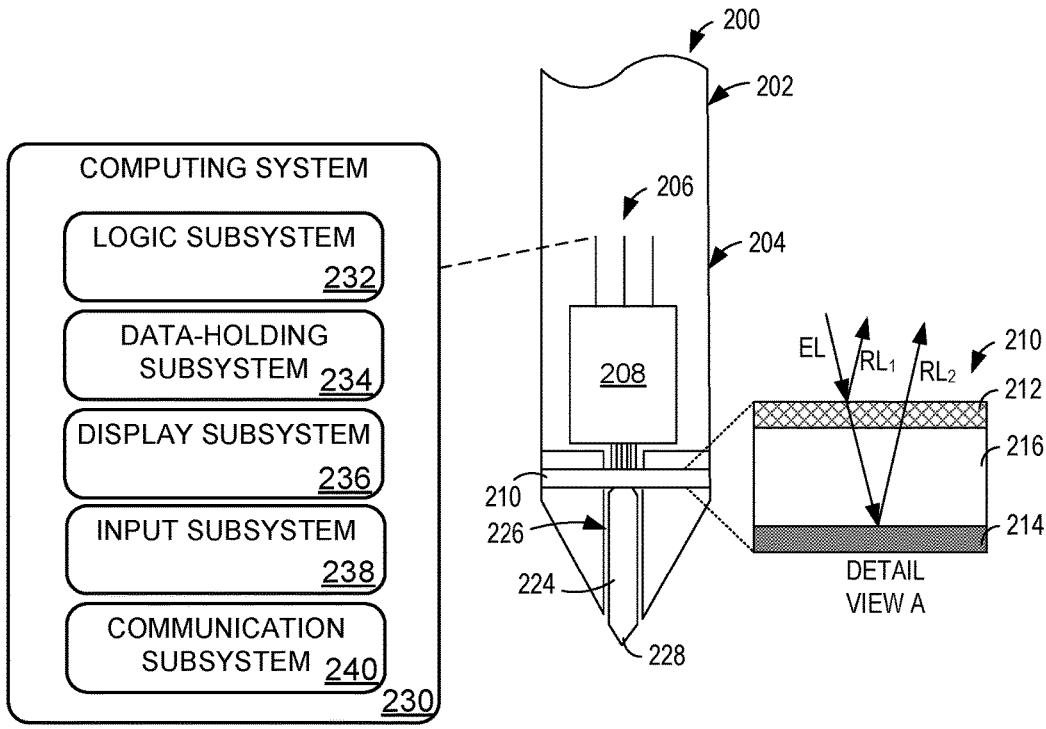
FIG. 2 is a schematic diagram of an example stylus including a force sensing mechanism.

FIG. 2 is a schematic diagram of an example stylus 200 including a stylus body 202 and a stylus tip 204. The stylus tip 204 includes a force sensing mechanism 206, which includes a light emitting device 208 and a compressible light reflecting optic 210. The light emitting device 208 includes a light emitter for directing light toward the compressible light reflecting optic 210 and a light detector for detecting reflected light from the compressible light, reflecting optic

210. The compressible light reflecting optic 210 may include three layers of material, shown in detail view A.

In the depicted example, a first reflective layer 212 of the light reflecting optic, closest to the light emitting device 208, includes partially-reflective material configured to reflect some emitted light, from the light emitter (e.g., half of the emitted light). The partially-reflective material is also configured to allow the remaining emitted light (e.g., the remaining half of the emitted light) from the light emitter to pass (e.g., to another layer of the light reflecting optic, as discussed below). The first reflective layer 212 may be partially silvered (e.g., half-silvered) such that a first portion of the layer 212 within a path of emitted light is silvered and a second portion of the layer 212 within the path of emitted light is not silvered (e.g., is transmissive). The reflective material of the first reflective layer 212 may be distributed across the layer in a regular or irregular pattern.

A second reflective layer 214 of the light reflective optic, further from the light emitting device 208 than the first reflective layer, includes reflective material configured to reflect light directed to the layer (e.g., all or substantially all light from the light emitter that is transmitted by the first reflective layer 212). The second reflective layer 214 may be more reflective (e.g., include more reflective material) than the first reflective layer 212, and thus reflect a larger percentage of light directed to and/or incident on the layer than the first reflective layer. For example, the second reflective layer 214 may be fully silvered and/or more silvered than the first reflective layer 212. The first reflective layer may include a lower density of the silvered material than the second reflective layer, such that, for a given surface area, the first reflective layer reflects less light than the second reflective layer.

The first reflective layer 212 may be spaced from the second reflective layer 214 by a compressible light-transmissive layer 216. The compressible light-transmissive layer 216 may include any suitable light-transmissive material (e.g., material that transmits all light and/or transmits more light than the first and second reflective layers 212 and 214), such as glass.

As shown in the detail view A, a first portion of emitted light EL from the light emitter may be reflected from the first reflective layer 212 as reflected light $RL_1$. A second portion of the emitted light EL may be transmitted through the light-transmissive layer 216 and reflected from the second reflective layer 214 as reflected light $RL_2$. In the depicted example, the distance that light travels through the light-transmissive layer 216 (e.g., after passing through the first reflective layer and after being reflected from the second reflective layer) contributes to a phase shift between the reflected light $RL_1$ and the reflected light $RL_2$. The phase shift also depends on the refractive index of the light-transmissive material in the light-transmissive layer and the angle of light incident on the first reflective layer.

As the light detector of the light emitting device 208 detects reflected light as a combination of the reflected light $RL_1$ and the reflected light $RL_2$, the above-described phase differential causes the reflected light from each layer to either constructively or destructively interfere with one another. The degree of interference depends on the difference in phase between the reflected light $RL_1$ and $RL_2$. The interference of the reflected light thereby affects the amplitude of light (e.g., the intensity of light and/or the amount of energy in light) detected by the light detector. In the depicted example, the amplitude of the light detected by the light detector varies from zero (fully destructive interference) to the amplitude of the light emitted from the light emitter of the light emitting device 208. When the thickness of the light-transmissive layer is a quarter-multiple of the wavelength of the emitted light from the light emitter, the reflected light Born the first and second reflective layers will destructively interfere with one another fully. This destructive interference results in a measured amplitude of zero at the light detector. When the thickness of the light-transmissive layer is a half-multiple of the wavelength of the emitted light from the light emitter, the reflected light from the first and second reflective layers constructively interfere with one another to a maximum degree. This constructive interference results in a measured amplitude at the light detector equal to the amplitude of the emitted light.

Accordingly, when the initial (e.g., uncompressed) thickness of the light-transmissive is known, the effect of compressing the light-transmissive layer (e.g., reducing the thickness) has a calculable effect on the amplitude of reflected light measured by the light detector. For example, the stylus tip 204 may include a moveable piston 224 that is housed within a chamber 226 of the stylus tip. The piston may transmit force applied to an external end 228 of the piston (e.g., when a user presses the stylus tip down on a surface) to the compressible light reflecting optic 210, thereby compressing the light-transmissive layer 216.

Figure 3:
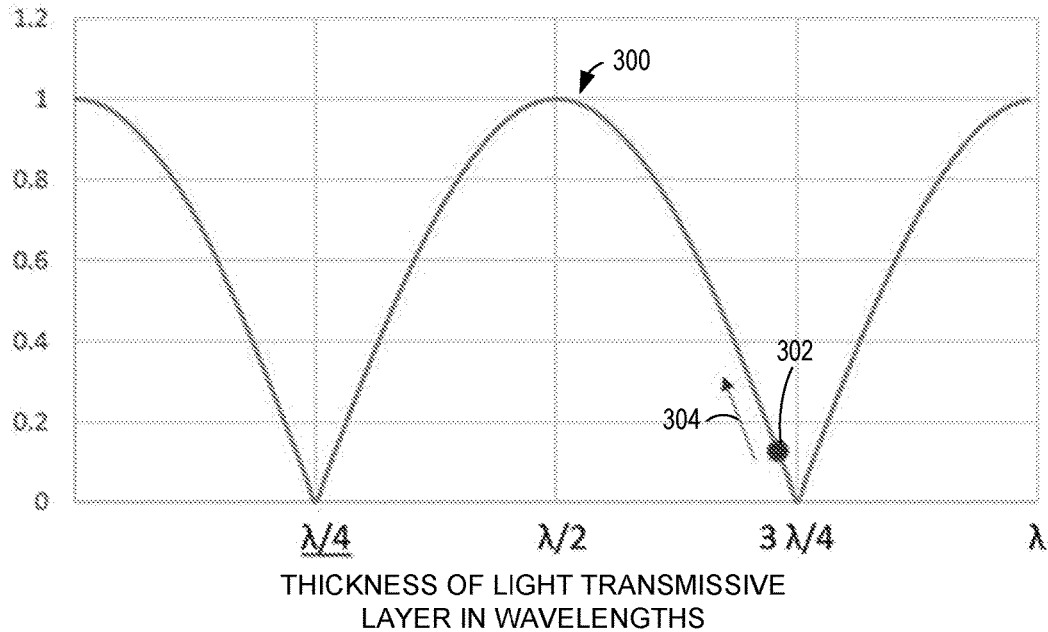
FIG. 3 is an example plot of relative amplitude of a reflected light beam detected at a light detector as a function of the thickness of a light-transmissive layer of a force sensing mechanism.

FIG. 3 flows an example effect that compressing the light-transmissive layer 216 may have on reflected light detected at a light detector. FIG. 3 shows a plot 300 of a relative amplitude (relative to an amplitude of emitted light from the light emitter) of a reflected light beam or ray detected at a light detector (e.g., the light detector of the light emitting device 208 of FIG. 2) as a function of the thickness of a light-transmissive layer (e.g., layer 216 of FIG. 2) separating two reflective layers (e.g., layers 212 and 214) of FIG. 2. As shown in FIG. 3, the relative amplitude of the detected reflected light beam or ray is zero when the light-transmissive layer is a thickness that is equal to a quarter-multiple of the wavelength of the emitted light. (e.g., ¼, ¾, 1¼, 1¾). The relative amplitude of the detected reflected light beam or ray is 1 (e.g., equal to the amplitude of the emitted light) when the light-transmissive layer is a thickness that is equal to a half-multiple of the wavelength of the emitted light (e.g., ½, 1, 1½, 2).

Accordingly if the starting (e.g., uncompressed) thickness of the light-transmissive layer is just under ¾ of the wavelength of the emitted light (represented by dot 302), an amplitude of reflected light detected at the light detector is just above zero. Any compression of the light-transmissive layer in this example would increase the amplitude of the detected reflected light, as indicated by arrow 304, until the light-transmissive layer reaches a thickness equal to a half wavelength of the emitted light (where the relative amplitude of the detected reflected light would be one).

In order to avoid confusion in determining an amount of compression of the light-transmissive layer based on a change in relative amplitude of the reflected light, the light-transmissive layer may be configured so that an expected maximum user force on the stylus tip induces a compressed deformation in the compressible layer of light-transmissive material that is less than one quarter of the wavelength of the emitted light. For example, the light detector may detect the same amplitude of reflected light when the thickness is just less than ½ the wavelength of the emitted light as when the thickness is just greater than ½ the wavelength of the emitted light. Accordingly, the light-transmissive layer may be configured to have a compressible range that is between a quarter-multiple of the wavelength of the emitted light and a half multiple of the wavelength of the emitted light.

The sensitivity of the force measurement may be readily adjusted by varying the thickness of the light-transmissive layer, such that the sensitivity of force measurements increase, with increasing light-transmissive layer thickness. The above-described relationship exists because a given compressive force causes a fractional reduction in thickness. That is, the reduction of thickness, measured in units of wavelength, increases in proportion to the total thickness of the light-transmissive layer.

In some embodiments, the methods and processes described herein may be tied to a computing system of one or re computing devices. In particular, such methods and processes may be implemented as a computer-application program or service, an application-programming interface (APT), a library, and/or other computer-program product. Returning to FIG. 2, the light emitting device 208 of the stylus 200 may be communicatively connected to a computing system 230 (e.g., via a wireless communication link) that may enact one or more of the methods and process described herein. The computing system 230 may be an example of computing device 100 of FIG. 1. The computing system 230 may be configured to transmit control instructions to the stylus and/or to receive data from the stylus. For example, the computing system 230 may receive an indication of the amplitude of reflected light detected at the light detector of the light emitting device 208. Based on the indication of the amplitude and other input a stored value indicating an uncompressed thickness of the light-transmissive layer, a refractive index of the light-transmissive layer, and/or a wavelength and amplitude of light emitted by the light emitter), the computing system 230 may determine an amount of force applied to a tip of the stylus. The amount of force applied to the tip of the stylus may affect an interpretation of input provided by the stylus 200 (e.g., a thickness of a line drawn by the stylus, an input mode of the stylus, etc.).

Computing system 230 is shown in simplified form. Computing system 230 may take the form of one or more tablet computers, mobile computing devices, mobile communication devices (e.g., smart phone), personal computers, server computers, home-entertainment computers, network computing devices, gaming devices, and/or other computing devices.

Computing system 230 includes a logic machine 232 and storage machine 234. Computing system 230 may optionally include a display subsystem 236, input subsystem 238, communication subsystem 240, and/or other components not shown in FIG. 2.

Logic machine 232 includes one or more physical devices configured to execute instructions. For example, the logic machine may be configured to execute instructions that are part of one or more applications services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 234 includes one or more physical devices configured to hold instructions executable by the logic machine to implement the methods and processes described herein. When such methods and processes are implemented, the state of storage machine 234 may be transformed—e.g., to hold different data.

Storage machine 234 may include removable and/or built-in devices. Storage machine 234 may include optical memory (e.g., CD, DVD, HD-DVD, Blu-Ray Disc, etc.), semiconductor memory (e.g., RAM, EPROM, NE PROM, etc.), and/or magnetic memory hard-disk drive, floppy-disk drive, tape drive, MRAM, etc.), among others. Storage machine 234 may include volatile, nonvolatile, dynamic, static, read/write, read-only, random-access, sequential-access, location-addressable, file-addressable, and/or content-addressable devices.

It will be appreciated that storage machine 234 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 232 and storage machine 234 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 236 may be used to present a visual representation of data held by storage machine 234. This visual representation may take the form of a graphical interface (GUI). As the herein described methods and processes change the data held by the storage machine, and thus transform the state of the storage machine, the state of display subsystem 236 may likewise be transformed to visually represent changes in the underlying data. Display subsystem 236 may include one or more display devices utilizing virtually any type of technology Such display devices may be combined with logic machine 232 and/or storage machine 234 in a shared enclosure, or such display devices may be peripheral display devices.

When included, input subsystem 238 may comprise or interface with one or more user-input devices such as a stylus (e.g., stylus 200), keyboard, mouse, touch screen, or game controller. When included, communication subsystem 240 may be configured to communicatively couple computing system 230 with one or more other computing devices and/or peripherals (e.g., stylus 200). Communication subsystem 240 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 230 to se and/or receive messages to and/or from other devices via a network such as the Internet.

Figure 4:
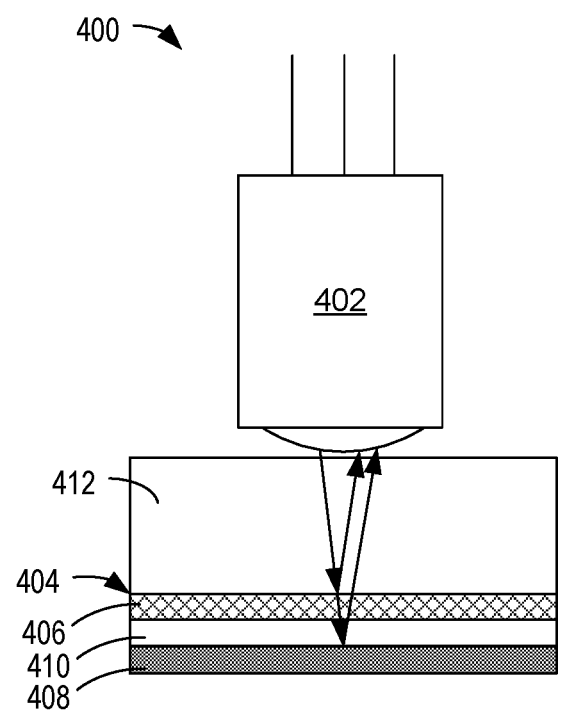
FIG. 4 is a schematic diagram of an example force sensing mechanism.

FIG. 4 schematically shows an example configuration of a force sensing mechanism 400. Force sensing mechanism 400 may be similar to the force sensing mechanism of stylus 200 of FIG. 2, and may include a light emitting device 402, and a compressible light-reflecting optic 404 including a first reflective layer 406, a second reflective layer 408, and a first, compressible light-transmissive layer 410 positioned between the first and second reflective layers. The above description of similarly-named components with respect to FIG. 2 may likewise to the associated components of FIG. 4.

As shown in FIG. 4, the force sensing mechanism 400 may further include a second light-transmissive layer 412 positioned between the light emitting device 402 and the compressible light-reflecting optic 404. For example, the second light-transmissive layer 412 may be in contact with the first reflective layer 406 and may be configured to transmit light from a light emitter of the light emitting device 402 toward the first reflective layer 406. The second light-transmissive layer 412 may include the same material and/or material composition as the first light-transmissive layer 410 (e.g., glass) in some examples. In other examples, the first and second light-transmissive layers may be formed of different materials.

The second light-transmissive layer 412 may be thicker than the first light-transmissive layer, since the reflected light is combined upon reaching the second light-transmissive layer. Once combined, the distance the reflected light travels to a light detector of the light emitting device 402 does not affect the amplitude of the light as detected. The use of a thicker second light-transmissive layer may enable the force sensing mechanism to be manufactured as a "sandwich" using vacuum deposition or other techniques to precisely control the thickness of the first light-transmissive layer (which does affect the amplitude of the light as detected).

Figure 5:
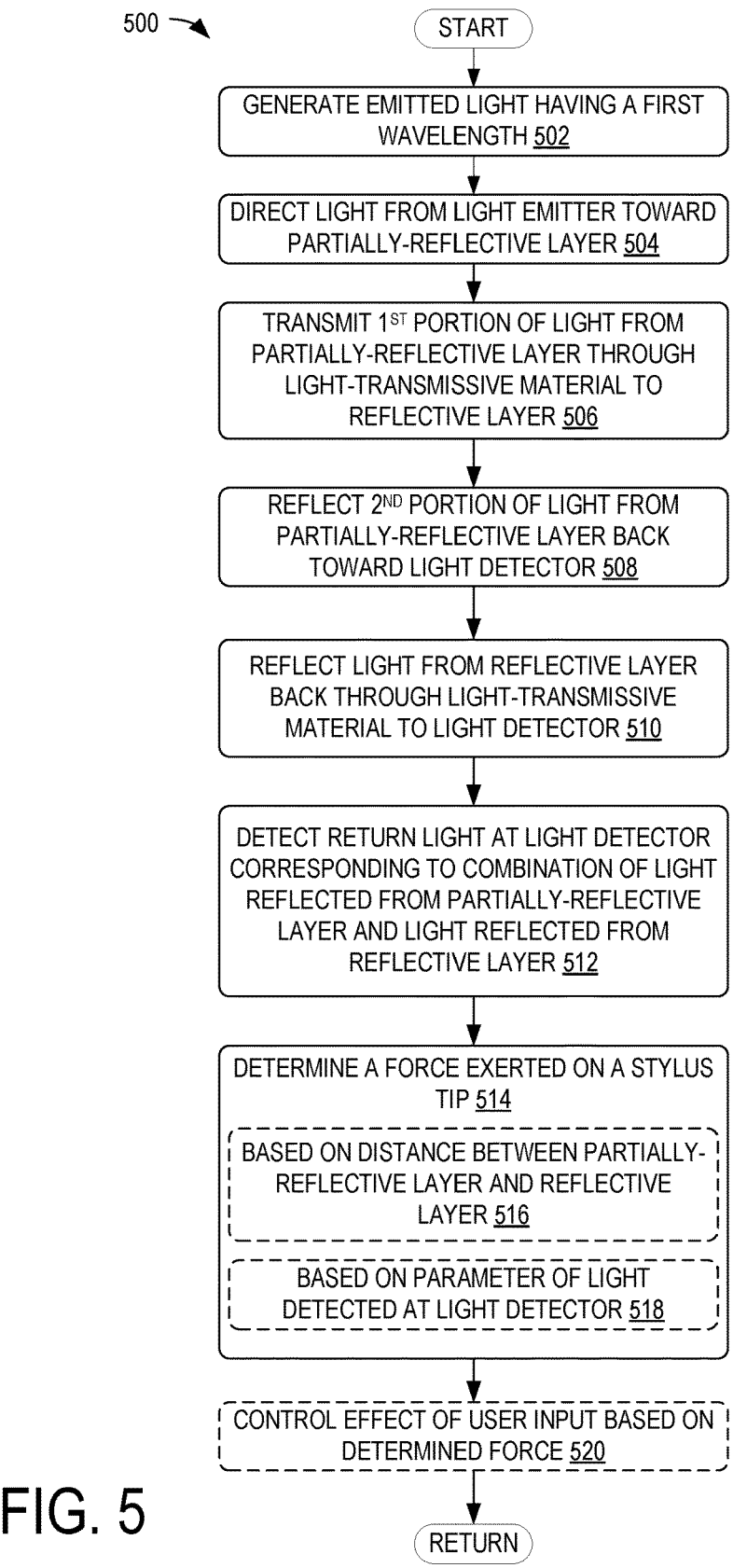
FIG. 5 is a flow chart of an example method for measuring force exerted on a stylus tip.

FIG. 5 is a flow chart of an example method 500 for measuring force applied to a stylus tip. For example, the stylus tip may be a part of a stylus such as stylus 200 or 300 of FIGS. 2 and 3, respectively. The stylus tip may include a light emitting device (e.g., light emitting device 208 of FIG. 2 and 402 of FIG. 4) and a compressible light reflecting optic (e.g., compressible light reflecting optic 210 of FIG. 2 and 404 of FIG. 4). At 502, the method includes generating, with a light emitter of the light emitting device, emitted light having a first wavelength.

At 504, the method includes directing the emitted light from the light emitter toward a first, partially-reflective layer of the light reflecting optic. For example, the light reflecting optic may include a compressible layer of light-transmissive material disposed between a first reflective layer and a second reflective layer, the second reflective layer being more reflective than the first reflective layer. The emitted light and the light reflecting optic being configured so that an expected maximum user force induces a compressed deformation in the compressible layer of light-transmissive material that is less than one quarter of the first wavelength.

At 506, the method includes transmitting a first portion of light from the first, partially-reflective layer through the light-transmissive material, to the second reflective layer. At 508, the method includes reflecting a second portion of the light from the first, partially-reflective layer back toward a light detector of the light emitting device. At 510, the method includes reflecting light from the reflective layer back through the light-transmissive material to the light detector.

At 512, the method includes detecting reflected light at a light detector of the light emitting device as a result of the direction of the emitted light to the light reflecting optic, the reflected light based on a combination of light reflected from the first reflective layer and light reflected from the second reflective layer. At 514, the method includes determining a force exerted on the stylus tip. For example, the force may be determined based on a distance between the first, partially reflective layer and the second reflective layer (e.g., a thickness of the light-transmissive material), as indicated at 516. As indicated at 518, the force may be determined based on a parameter of light detected at the light detector, such as the amplitude of the detected reflected light, as described above with respect to FIGS. 2 and 3.

For example, the parameter(s) of the detected reflected light may be measured by the light detector, and an indication of such parameters may be transmitted from the light detector to processing circuitry operatively coupled to the light detector, such as the input subsystem 238 and associated logic and storage machines 232 and 234 of FIG. 2. The processing circuitry nay determine a force applied to the stylus tip (e.g., applied to the compressible light reflecting optic) based on the output of the light detector and/or based on stored data such as an initial/uncompressed thickness of the light transmissive layer sandwiched between the first and second reflective layers, an amplitude and/or other parameters of light emitted from the light emitter, and/or any other suitable factor. The processing circuitry may generate a processed output indicating the force applied to the stylus tip.

The processed output may be supplied to another processing module or logic of a computing device to control the user experience based on the force measurement/determination. For example, as indicated at 520, the method may optionally include controlling an effect of user input via the stylus based on the determined force. As described above, features such as a thickness of a line drawn by the stylus or an input mode of the stylus may be changed based on the force exerted on the stylus tip and determined at 514.

The above-described force sensing mechanisms may be utilized in a stylus or other device to measure force over a particular range (e.g., 10 to 200 grams) with a minimal amount of displacement of the object to which force is applied (e.g., a moveable piston a stylus tip). By minimizing this displacement, a user may utilize the device (e.g., the stylus) without unnatural feedback, such as a "pogo stick" feel of a compressed spring.

Another example provides for a stylus including a stylus body, and a stylus tip, the stylus tip including a light emitting device and a compressible light reflecting optic, the light emitting device comprising a light emitter and a light detector, and the compressible light reflecting optic comprising: a first reflective layer configured to (i) allow a first portion of light from the light emitting device to pass and (ii) to reflect a second portion of light from the light emitting device, and a second reflective layer, more reflective than the first reflective layer, configured to reflect light from the light emitting device, the first layer being spaced from the second layer by a light-transmissive material, wherein a force exerted on the stylus tip is measurable by processing circuitry operatively coupled to the light emitting device based at least on a parameter of light reflected from the compressible light reflecting optic and received at the light detector. In such an example, the light-transmissive material may additionally or alternatively include a first layer of light-transmissive material, and the light emitting device may additionally or alternatively be spaced from the first reflective layer of the light reflecting optic by a second layer of light-transmissive material. In such an example, the second layer of light-transmissive material may additionally or alternatively be the same type of material as the first layer of light-transmissive material. In such an example, the second layer of light-transmissive material may additionally or alternatively be thicker than the first layer of light-transmissive material. In such an example, the parameter of light may additionally or alternatively include an amplitude of the light received at the light detector, the amplitude being a function of a phase relation of a first light ray reflected by the first reflective layer and a second light ray reflected by the second reflective layer. In such an example, the force exerted on the stylus tip may additionally or alternatively be further measurable based at least on a thickness of the light-transmissive material, where sensitivity of a force measurement increases as the thickness of the light-transmissive material increases. In such an example, the first reflective layer and the second reflective layer may additionally or alternatively each include silvered materials, the first reflective layer including a lower density of the silvered material than the second reflective layer. In such an example, the stylus tip may additionally or alternatively include a piston housed in a chamber of the stylus tip, the piston transmitting force applied to an external end of the piston to the compressible light reflecting optic. Any or all of the above-described examples may be combined in any suitable manner in various implementations.

Another example provides for a force detection sensor, the force detection sensor including a light emitting device comprising a light emitter and a light detector, a compressible light reflecting optic, the compressible light reflecting optic including a first, partially reflective configured to allow a first portion of light from the light emitting device to pass and to reflect a second portion of light from the light emitting device, and the compressible light reflecting optic including a second, reflective layer configured to reflect light from the light emitting device, the first layer being spaced from the second layer by a light-transmissive material, and processing circuitry operatively coupled to the light emitting device and configured to: receive, from the light detector, output indicating a parameter of reflected light from the compressible light reflecting optic, the reflected light based on a combination of light reflected from the first, partially reflective layer and light reflected from the second, reflective layer, determine, based at least on the output of the light detector, a force applied to the compressible light reflecting optic, and generate a processed output indicating the force applied to the compressible light reflecting optic. In such an example, the light-transmissive material may additionally or alternatively be a first layer of light-transmissive material, and the light emitting device may additionally or alternatively be spaced from the first, partially reflective layer of the light reflecting optic by a second layer of light-transmissive material. In such an example, the second layer of light-transmissive material may additionally or alternatively be a same type of material as the first layer of light-transmissive material. In such an example, the second layer of light-transmissive material may additionally or alternatively be thicker than the first layer of light-transmission, material. In such an example, the parameter of light may additionally or alternatively include an amplitude of the light received at the light detector, the amplitude being a function of a phase relation of a first light ray reflected by the first, partially reflective layer and a second light ray reflected by the second, reflective layer. In such an example, the force exerted on the stylus tip may additionally or alternatively be further measurable based at least on a thickness of the light-transmissive material, where sensitivity of a force measurement increases as the thickness of the light-transmissive material increases. In such an example, the first, partially reflective layer may additionally or alternatively be a half-silvered layer of material and the second, reflective layer may additionally or alternatively be a silvered layer of material. In such an example, the stylus tip may additionally or alternatively include a piston housed in a chamber of the stylus tip, the piston transmitting force applied to an external end of the piston to the compressible light reflecting optic. Any or all of the above-described examples may be combined in any suitable manner in various implementations.

Another example provides for a method of measuring force exerted on a stylus tip including a light emitting device and a compressible light reflecting optic, the method including generating, with a light emitter of the light emitting device, emitted light having a first wavelength, directing the emitted light from the light emitter toward the light reflecting optic, the light reflecting optic having a compressible layer of light-transmissive material disposed between a first reflective layer and a second reflective layer, the second reflective layer being more reflective than the first reflective layer and the emitted light and the light reflecting optic being configured so that an expected maximum user force induces a compressed deformation in the compressible layer of light-transmissive material that is less than one quarter of the first wavelength, detecting reflected light at a light detector of the light emitting device as a result of the direction of the emitted light to the light reflecting optic, the reflected light based on a combination of light reflected from the first reflective layer anal light reflected from the second reflective layer, and determining a force exerted on the stylus tip based at least on a parameter of light detected at the light detector. In such an example, the parameter of light may additionally or alternatively include an amplitude of the reflected light detected at the light detector, the amplitude being a function of a phase relation of a first light ray reflected by the first reflective layer and a second light ray reflected by the second reflective layer. In such an example, the stylus tip may additionally or alternatively include a piston housed in a chamber of the stylus tip, the piston transmitting force applied to an external end of the piston to the compressible light reflecting optic. In such an example, the first reflective layer may additionally or alternatively include a half-silvered layer of material and the second reflective layer may additionally or alternatively include a silvered layer of material. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A stylus, comprising:
a stylus body; and
a stylus tip;
the stylus tip including a light emitting device and a compressible light reflecting optic, the light emitting device comprising a light emitter and a light detector, and the compressible light reflecting optic comprising:
a first reflective layer configured to (i) allow a first portion of light from the light emitting device to pass and (ii) to reflect a second portion of light from the light emitting device, and
a second reflective layer, more reflective than the first reflective layer, configured to reflect light from the light emitting device, the first reflective layer being spaced from the second reflective layer by a first light-transmissive layer, and the first reflective layer being spaced apart from the light emitting device by a second light-transmissive layer,
wherein a force exerted on the stylus tip is measurable by processing circuitry operatively coupled to the light emitting device based at least on an amplitude of light reflected from the compressible light reflecting optic and received at the light detector, wherein the amplitude is a function of a phase relation of a first light ray reflected by the first reflective layer and a second light ray reflected by the second reflective layer, said phase relation varying based on a spacing between the first reflective layer and the second reflective layer, said spacing varying based on the force exerted on the stylus tip.

2. The stylus of claim 1, wherein the second light-transmissive layer is a same type of material as the first light-transmissive layer.

3. The stylus of claim 1, wherein the second light-transmissive layer is thicker than the first light-transmissive layer.

4. The stylus of claim 1, wherein the force exerted on the stylus tip is further measurable based at least on a thickness of the first light-transmissive layer, where sensitivity of a force measurement increases as the thickness of the first light-transmissive layer increases.

5. The stylus of claim 1, wherein the first reflective layer and the second reflective layer each include silvered materials, the first reflective layer including a lower density of the silvered material than the second reflective layer.

6. The stylus of claim 1, wherein the stylus tip includes a piston housed in a chamber of the stylus tip, a piston transmitting force applied to an external end of the piston to the compressible light reflecting optic.

7. A force detection sensor, comprising:
a light emitting device comprising a light emitter and a light detector;
a compressible light reflecting optic including
a first, partially reflective layer configured to allow a first portion of light from the light emitting device to pass and to reflect a second portion of light from the light emitting device, and
a second reflective layer configured to reflect light from the light emitting device, the first reflective layer being spaced from the second reflective layer by a first light-transmissive layer, and the first reflective layer being spaced apart from the light emitting device by a second light-transmissive layer; and
processing circuitry operatively coupled to the light emitting device and configured to:
receive, from the light detector, output indicating an amplitude of reflected light from the compressible light reflecting optic,
determine, based at least on the amplitude of the reflected light, a force applied to the compressible light reflecting optic, wherein the amplitude of reflected light is a function of a phase relation of a first light ray reflected by the first, partially reflective layer and a second light ray reflected by the second reflective layer, said phase relation varying based on a spacing between the first, partially reflective layer and the second, partially reflective layer, said spacing varying based on the force exerted on the compressible light reflecting optic, and
generate a processed output indicating the force applied to the compressible light reflecting optic.

8. The force detection sensor of claim 7, wherein the second light-transmissive layer is a same type of material as the first light-transmissive layer.

9. The force detection sensor of claim 7, wherein the second light-transmissive layer is thicker than the first light-transmissive layer.

10. The force detection sensor of claim 7, wherein the force applied to the compressible light reflecting optic is determined further based at least on a thickness of the first light-transmissive layer, where sensitivity of a force measurement increases as the thickness of the first light-transmissive layer increases.

11. The force detection sensor of claim 7, wherein the first, partially reflective layer is a half-silvered layer of material and the second, reflective layer is a silvered layer of material.

12. The force detection sensor of claim 7, further comprising a stylus tip, wherein the stylus tip includes the compressible light reflecting optic and a piston housed in a chamber of the stylus tip, a piston transmitting force applied to an external end of the piston to the compressible light reflecting optic.

13. A method of measuring force exerted on a stylus tip including a light emitting device and a compressible light reflecting optic, the method comprising:
generating, with a light emitter of the light emitting device, emitted light having a first wavelength;
directing the emitted light from the light emitter toward the light reflecting optic, the light reflecting optic having a first light-transmissive layer disposed between a first reflective layer and a second reflective layer and a second light-transmissive layer disposed between the first reflective layer and the light emitting device, the second reflective layer being more reflective than the first reflective layer, and the light reflecting optic being configured so that an expected maximum user force induces a compressed deformation in the first light-transmissive layer that is less than one quarter of the first wavelength;
detecting reflected light at a light detector of the light emitting device as a result of the direction of the emitted light to the light reflecting optic, the reflected light based on a combination of light reflected from the first reflective layer and light reflected from the second reflective layer; and
determining a force exerted on the stylus tip based at least on an amplitude of light detected at the light detector, wherein the amplitude is a function of a phase relation of a first light ray reflected by the first reflective layer and a second light ray reflected by the second reflective layer, said phase relation varying based on a spacing between the first reflective layer and the second reflective layer, said spacing varying based on the force exerted on the stylus tip.

14. The method of claim 13, wherein the stylus tip includes a piston housed in a chamber of the stylus tip, a piston transmitting force applied to an external end of the piston to the compressible light reflecting optic.

15. The method of claim 13, wherein the first reflective layer comprises a half-silvered layer of material and the second reflective layer comprises a silvered layer of material.

16. The stylus of claim 1, wherein the first light-transmissive layer is configured to have a compressible range that is between a quarter-multiple and a half-multiple of a wavelength of the light reflected from the compressible light reflecting optic and received at the light detector.

17. The force detection sensor of claim 7, wherein the first light-transmissive layer is configured to have a compressible range that is between a quarter-multiple and a half-multiple of a wavelength of the light reflected from the compressible light reflecting optic and received at the light detector.

* * * * *